United States Patent

Fuchs

[11] Patent Number: 5,555,626
[45] Date of Patent: Sep. 17, 1996

[54] RECIPROCATING DRIVE MECHANISM

[75] Inventor: Rudolf Fuchs, Neuhausen, Germany

[73] Assignee: S-B Power Tool Company, Chicago, Ill.

[21] Appl. No.: 563,135

[22] Filed: Nov. 27, 1995

[51] Int. Cl.$^6$ .................................. B23D 49/04
[52] U.S. Cl. ........................... 30/393; 30/392; 74/60
[58] Field of Search .................. 30/392–394, 369; 74/60; 173/48, 205, 201

[56] References Cited

U.S. PATENT DOCUMENTS

| | | | |
|---|---|---|---|
| 2,793,661 | 5/1957 | Olson | 30/393 |
| 3,945,120 | 3/1976 | Ritz | 30/393 |
| 4,537,264 | 8/1985 | Schmidt et al. | 74/60 X |
| 5,025,562 | 6/1991 | Palm | 30/393 X |
| 5,450,925 | 9/1995 | Smith et al. | 30/394 X |

*Primary Examiner*—Douglas D. Watts
*Attorney, Agent, or Firm*—Jones, Day, Reavis & Pogue

[57] ABSTRACT

The reciprocating saw has a motor driven assembly which operates in the nature of a wobble plate. One end of the assembly is connected to a spindle for reciprocating the same. The other end of the assembly is connected to a counterweight whereby the spindle and the counterweight are simultaneously reciprocated in opposite directions. The counterweight is generally U-shaped such that its center of gravity is located near the spindle.

5 Claims, 2 Drawing Sheets

RECIPROCATING DRIVE MECHANISM

The present invention relates to power tools. More particularly, the present invention relates to a reciprocating drive mechanism with a counterweight.

BACKGROUND OF THE INVENTION

Power tools, such as reciprocating saws, generate considerable vibration thereby increasing operator fatigue and making accurate cuts somewhat difficult. Thus, counterweight mechanisms have been developed to minimize vibration.

A counterweight mechanism for a reciprocating saw is disclosed in U.S. Pat. No. 5,025,562. The mechanism shown in this patent provides an in-line counterweight driven by a first wobble plate. A second wobble plate drives the spindle. Accordingly, this mechanism is disadvantageous in requiring two wobble plates.

SUMMARY OF THE INVENTION

The present invention provides a unique counterweight which can be driven by the same wobble plate used to drive the spindle.

A primary object of the present invention is the provision of a reciprocating drive mechanism whereby a single wobble plate drives both the spindle and the counterweight.

Another object of the present invention is the provision of a counterweight in a drive mechanism of the type described wherein the counterweight is shaped to locate its center of gravity near the spindle thereby minimizing vibration.

Still another object of the present invention is the provision of a drive mechanism of the type described wherein the counterweight is uniquely mounted for reciprocating movement along an axis parallel to the spindle.

These and other objects and advantages of the invention will become apparent from the following specification and drawings.

DESCRIPTION OF A PREFERRED EMBODIMENT

Figure 1:
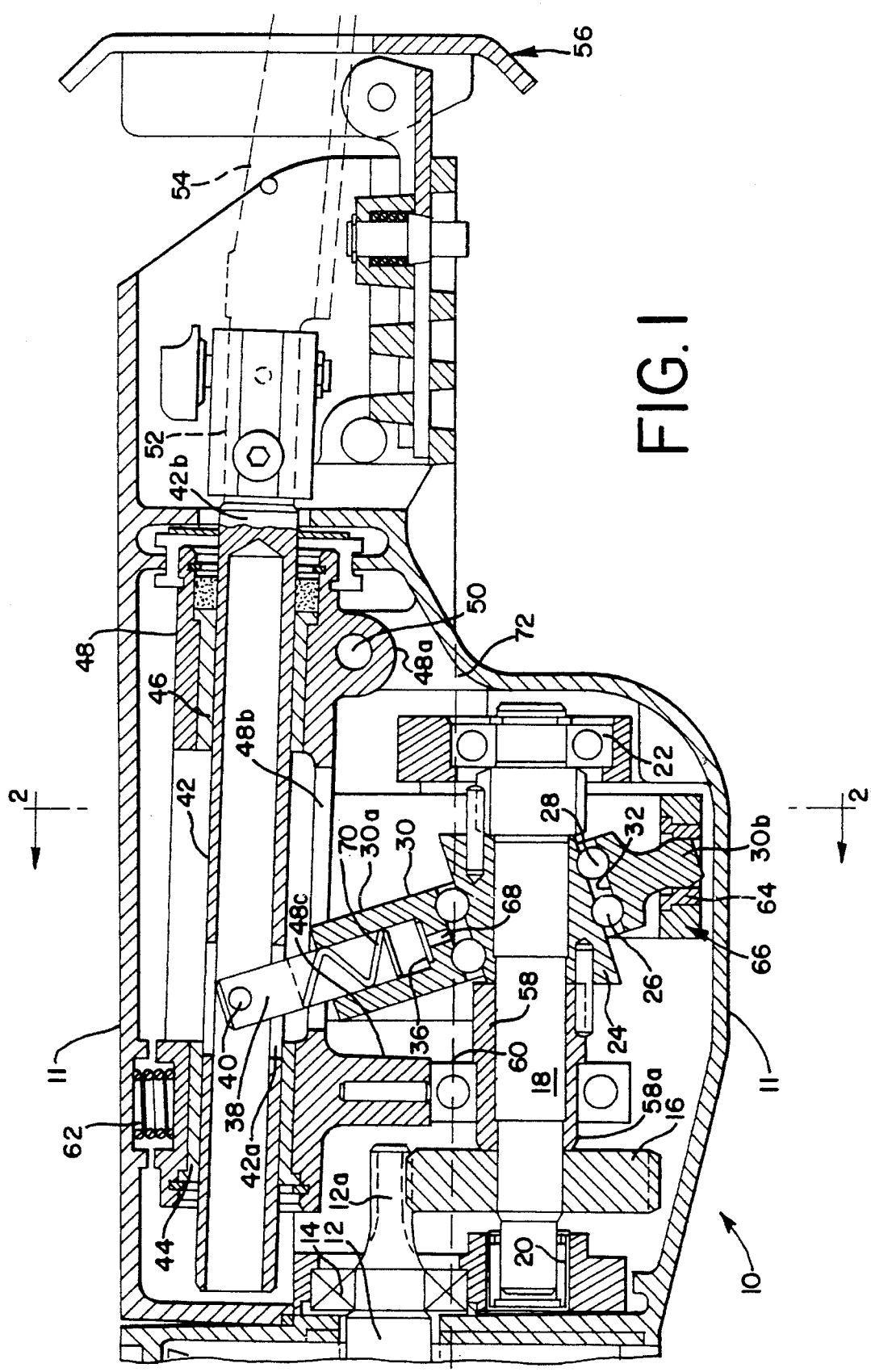
FIG. 1 is a vertical longitudinal section of a reciprocating saw embodying the present invention.

Referring particularly to FIG. 1, a portion of a reciprocating power saw, generally designated 10, includes a housing or casing 11. The tool includes an electric motor (not shown) having an output shaft 12 mounted in a bearing structure 14. The output shaft 12 terminates in a pinion formation 12a which meshes with teeth on a gear 16. This gear is mounted on a drive shaft 18 for rotation therewith. The shaft 18 has its opposite ends mounted for rotation in bearing assemblies 20 and 22. Thus, it is apparent that energization of the motor will impart rotation to the shaft 18 through a reduction gear assembly constituted by the pinion 12a and the gear 16.

The shaft 18 mounts an eccentric cylindrical formation 24 for rotation therewith. This eccentric formation includes parallel, annular races for receiving first and second sets of ball bearings 26 and 28.

A first drive member 30 includes an opening defined by a cylindrical wall 32. This cylindrical wall includes parallel annular races for receiving the sets of ball bearing members 26 and 28. Thus, the sets of ball bearings serve to mount the drive member 30 on the shaft 18. It will be apparent that upon rotation of the shaft 18, a wobbling movement will be imparted to the drive member 30 by reason of the eccentric formation 24.

The drive member 30 includes a first extension 30a having a blind opening or bore 36 slidably receiving a second drive member 38 which is cylindrical in the nature of a piston. The drive member 38 includes a diametrically disposed opening receiving a pin 40, opposite ends of which are received in apertures in the wall of a hollow cylindrical spindle 42. The spindle 42 includes a slot 42a which freely receives the cylindrical drive member 38.

The cylindrical spindle is mounted for reciprocal sliding movement in first and second annular bearings 44 and 46. These bearings are mounted in a sleeve 48. This sleeve has an integral extension 48a with an aperture for receiving a pin 50, opposite ends of which are supported by the housing 11. Thus, it will be understood that the sleeve 48 is mounted for pivoting movement about the axis of the pin 50. The sleeve includes an opening 48b to accommodate movement of the drive members.

The spindle 42 includes a forward, integral solid formation 42b mounting a tool holder 52. This tool holder mounts a saw blade 54.

The tool 10 includes an adjustable guide shoe assembly, generally designated 56. This adjustable guide shoe mechanism is preferably of the type disclosed and claimed in application Ser. No. 08/200,384, filed Feb. 23, 1994, now U.S. Pat. No. 5,421,091, assigned to the assignee of the present invention.

It will be apparent that upon rotation of the shaft 18, reciprocating movement will be imparted to the spindle 42 and consequently to the saw blade 54. During this reciprocating movement of the spindle 42, the drive member 38 will slide in and out of the opening 36 in the drive member 30. These two drive members may be considered as constituting a wobble plate unit.

It will be noted that the drive shaft 18 mounts a second cylindrical member 58 having an eccentric portion 58a. This eccentric formation mounts an annular member 60 for rotation with the shaft 18.

The sleeve 48 includes an integral depending formation 48c arranged to engage the eccentrically mounted member 60. A coil spring 62 has its opposite ends received within recesses in the interior wall of the casing 11 and in the sleeve 48. Thus, the spring 62 will tend to urge the formation 48c into engagement with the eccentric 60 for pivoting or rocking the sleeve 48 about the axis of the pin 50. Accordingly, when the formation 48c is in engagement with the cylindrical member 60 under the influence of the spring 62, an orbital movement will be imparted to the saw blade 54. Means (not shown) may be provided to maintain the formation 48c out of engagement with the eccentrically mounted member 60 if only reciprocating movement is desired. When orbital movement is present, the reciprocation of the spindle 42 is still substantially rectilinear. Of course, when the orbital feature is not being used, the spindle reciprocates along a true rectilinear axis. The axis of reciprocation of the spindle is substantially parallel with the axis of rotation of the drive shaft 18.

It will be noted that the drive member 30 includes a second extension 30b shaped in the nature of a knob and movably received within an annular bearing 64 mounted in a counterweight, generally designated 66. This counterweight will be described in detail below.

It is seen that the drive member 30 is provided with a port 68 having one end in communication with the base of the bore 36. The other end of the port 68 is in communication with an annular space defined by the cylindrical wall 32 in the drive member 30 and the outer cylindrical wall of the eccentric formation 24. The cylindrical drive member 38 is provided with a helical groove 70 formed on the exterior thereof. One end of this helical groove extends to the inner end of the cylindrical drive member 38. The other end of the groove 70 extends to a portion of the drive member 38 which is always outside of the opening 36.

A suitable supply of a lubricant, such as grease, is contained within the lower portion of the tool housing 11. Preferably, the amount of grease will be such that it is maintained to the level indicated by the broken line 72.

Centrifugal forces, developed by rotation of the shaft 18 and eccentric formation 24, will force the lubricant through the bore 68 into the base of the cylindrical opening 36. Accordingly, a supply of the lubricant will be provided to the base of the opening 36. Further, during sliding movement of the cylindrical drive member 38 out of the cylindrical opening 36, a partial vacuum will be created which tends to draw the lubricant into the base of the cylindrical opening 36. When the cylindrical member 38 slides inwardly of the opening 36, the lubricant in the base of the latter will be forced into and along the helical groove 70 for lubricating the areas of contact between the exterior surface of the drive member 38 and the wall of the cylindrical opening 36. This lubrication system is disclosed and claimed in pending U.S. application Ser. No. 08/222,890, filed Apr. 4, 1994, now U.S. Pat. No. 5,450,925, assigned to the assignee of the present application.

Figure 2:
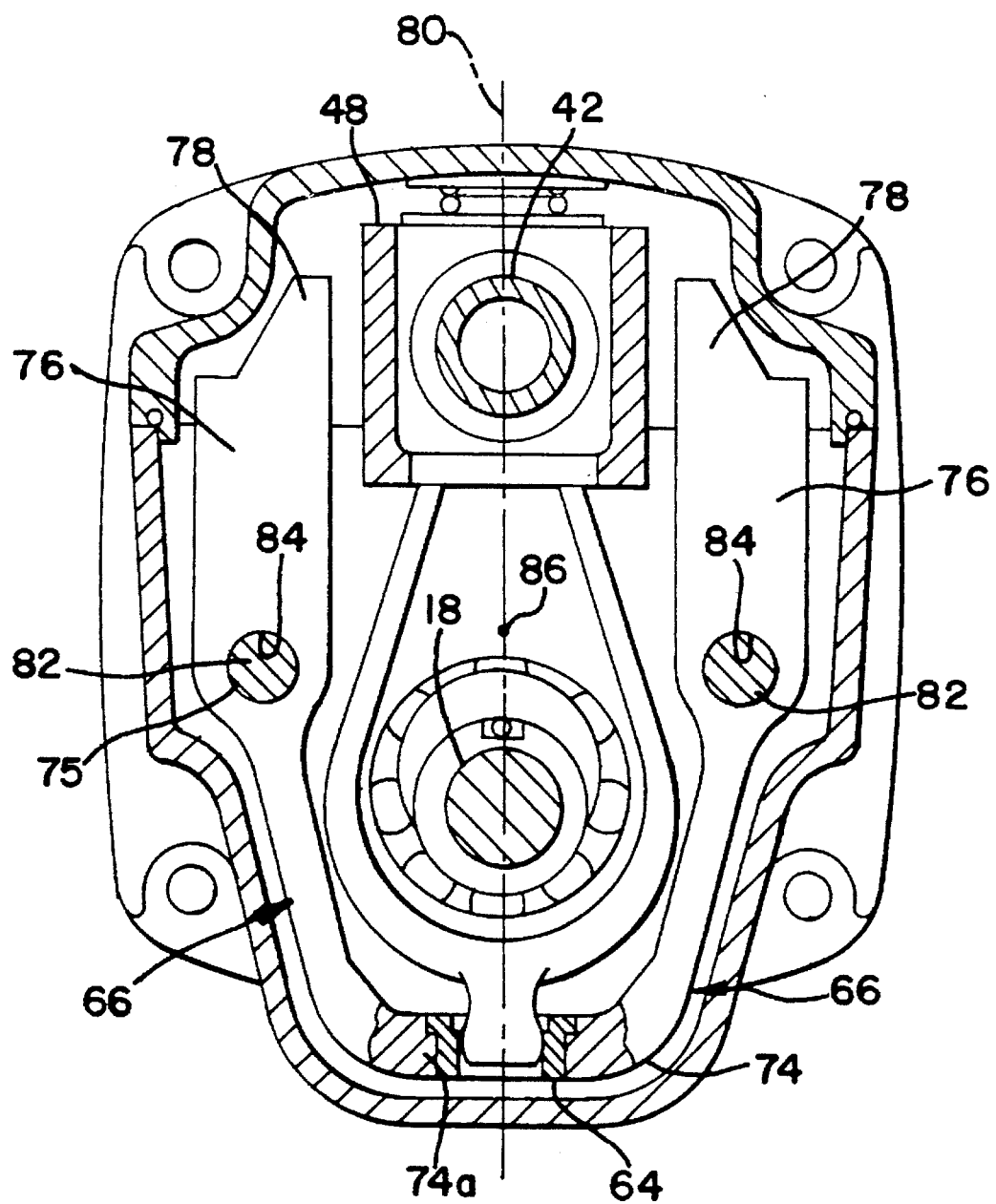
FIG. 2 is a section taken along the line 2—2 of FIG. 1.

Turning now to FIG. 2 in particular, the counterweight 66 is seen to be of generally U-shaped construction including a bight portion 74 and arms 76 having distal end portions 78. The bight portion includes an opening 74a receiving the bearing 64. The counterweight is symmetrical with respect to its vertical centerline 80.

A pair of rods 82 is suitably mounted in the tool housing; these rods are parallel with each other and with the drive shaft 18. The counterweight arms 76 include bores 84 slidably receiving respective ones of the rods 82. Thus, the counterweight is mounted in the housing for reciprocal movement about a path or axis parallel to the axis of the drive shaft 18.

It is noted that the distal ends 78 of the counterweight extend upwardly to the maximum extent possible while allowing the necessary clearance between the housing 11 and the sleeve 48. Portions of the spindle 42 and sleeve 48 are disposed between the distal ends 78 of the counterweight. Shaping the counterweight in this manner results in locating the center of gravity of the counterweight on a longitudinal axis 86 which intersects the vertical axis 80. It is desirable to have the center of gravity of the counterweight as close as possible to the axis of reciprocation of the spindle to minimize vibration. In the embodiment shown for purposes of illustration, it is noted that the center of gravity of the counterweight is between the drive shaft 18 and the spindle 42.

It is now seen that the present invention provides a reciprocating drive system whereby a single wobble plate unit drives both the spindle and the counterweight. The counterweight is shaped such that its center of gravity is disposed between the drive shaft and the spindle. The U-shape configuration of the counterweight results in having the center of gravity of the counterweight as near as possible to the axis of reciprocation of the spindle.

It will be understood that the present invention is not to be limited to the specific preferred embodiment disclosed herein. The present invention embodies all modifications and variations within the scope of the following claims.

I claim:

1. A reciprocating drive mechanism for a power tool comprising:

(a) a housing;

(b) a drive shaft rotatably mounted in said housing;

(c) a spindle mounted in said housing for reciprocating motion along a substantially rectilinear first axis;

(d) a counterweight mounted in said housing for reciprocating motion along a second axis parallel to said first axis, said counterweight being shaped such that its center of gravity is located between said spindle and said drive shaft; and (e) a wobble plate unit mounted on said drive shaft and having a first end connected to said spindle and a second end connected to said counterweight, whereby upon rotation of said drive shaft said spindle and said counterweight are simultaneously reciprocated in opposite directions.

2. The drive mechanism according to claim 1 wherein said counterweight is generally U-shaped thereby defining a bight portion and distal end portions, at least a portion of said spindle being disposed between said distal ends, said second end of said wobble unit being connected to said counterweight at said bight portion thereof.

3. A reciprocating drive mechanism comprising:

(a) a housing;

(b) a drive shaft mounted in said housing for rotation about a first axis;

(c) a spindle mounted in said housing for reciprocating motion along a second substantially rectilinear axis parallel with said first axis;

(d) a pair of rods mounted in said housing parallel to said first axis and disposed one on each side of said spindle;

(e) a counterweight having a pair of bores receiving respective ones of said rods thereby mounting said counterweight for reciprocating movement along a third axis parallel to said first axis, said counterweight being shaped such that its center of gravity is located between said spindle and said drive shaft; and (f) a wobble plate unit mounted on said drive shaft and having a first end connected to said spindle and a second end connected to said counterweight, whereby upon rotation of said drive shaft said spindle and said counterweight are simultaneously reciprocated in opposite directions.

4. The drive mechanism according to claim 3 wherein said counterweight is generally U-shaped thereby defining a bight portion and distal end portions, at least a portion of said spindle being disposed between said distal ends, said second end of said wobble plate unit being connected to said counterweight at said bight portion thereof.

5. The drive mechanism according to claim 4 wherein said bores are formed in respective ones of said distal ends.

\* \* \* \* \*